United States Patent
Sharma et al.

(10) Patent No.: US 12,026,406 B2
(45) Date of Patent: Jul. 2, 2024

(54) PULL-PRINT SERVERS

(71) Applicant: Hewlett-Packard Development Company, L.P., Spring, TX (US)

(72) Inventors: Rahul Sharma, Bangalore (IN); Puranjaya Pradhan, Bangalore (IN); Abhishek Avasthi, Bangalore (IN)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/908,346

(22) PCT Filed: Feb. 25, 2021

(86) PCT No.: PCT/US2021/070193
§ 371 (c)(1),
(2) Date: Aug. 31, 2022

(87) PCT Pub. No.: WO2021/253023
PCT Pub. Date: Dec. 16, 2021

(65) Prior Publication Data
US 2023/0087856 A1 Mar. 23, 2023

(30) Foreign Application Priority Data
Jun. 9, 2020 (IN) .............................. 202041024216

(51) Int. Cl.
*G06F 3/12* (2006.01)
(52) U.S. Cl.
CPC ............ *G06F 3/121* (2013.01); *G06F 3/1207* (2013.01); *G06F 3/1208* (2013.01);
(Continued)

(58) Field of Classification Search
None
See application file for complete search history.

(56) References Cited

U.S. PATENT DOCUMENTS 7,190,469 B1 3/2007 Gomi
7,986,421 B2 7/2011 Chen et al.
(Continued)

FOREIGN PATENT DOCUMENTS

JP 2008-107921 A 5/2008
WO 2015/174233 A1 11/2015

OTHER PUBLICATIONS

Drucken, S., "FollowMe Printing brings you security and cost savings" PRINTER4YOU, retrieved at https://web.archive.org/web/20190828160012/https://www.printer4you.com/en/follow-me-printing, retrieved on Mar. 19, 2020, p. 5.

*Primary Examiner* — Darryl V Dottin
(74) *Attorney, Agent, or Firm* — Brooks, Cameron & Huebsch, PLLC

(57) ABSTRACT

A pull-print server may include a receiver to receive a print job from a client device. The print job includes a first page and a second page. Further, the pull-print server may include a transmitter to transmit the print job to a printer via a network in response to a reception of a first pull-print request from the printer. The pull-print server may include a controller to receive page count information from the printer upon completion of printing of the first page. The page count information indicates a number of pages printed corresponding to the print job. Further, the controller may detect an interruption of the print job prior to completion of the print job and cause the interrupted print job to resume on the printer based on the page count information and in response to a reception of a second pull-print request from the printer.

16 Claims, 5 Drawing Sheets

(52) U.S. Cl.
CPC .......... *G06F 3/1236* (2013.01); *G06F 3/1253* (2013.01); *G06F 3/1288* (2013.01)

(56) References Cited

U.S. PATENT DOCUMENTS

| | | |
|---|---|---|
| 8,531,711 B2 | 9/2013 | Kitagata |
| 2006/0077456 A1 | 4/2006 | Aoki |
| 2006/0126102 A1 | 6/2006 | Sakuda |
| 2006/0251224 A1* | 11/2006 | Fukumizu ............... G06F 21/42 379/93.01 |
| 2007/0146778 A1* | 6/2007 | Kitagata ............... G06F 3/1248 358/1.15 |
| 2015/0036182 A1 | 2/2015 | Nakamura |
| 2015/0237231 A1* | 8/2015 | Hirose .................. G06F 3/1288 358/1.15 |
| 2016/0012465 A1* | 1/2016 | Sharp .................. G06Q 20/321 705/14.17 |
| 2019/0391774 A1 | 12/2019 | Nakatani |

* cited by examiner

PULL-PRINT SERVER 102

RECEIVER 110

TRANSMITTER 112

CONTROLLER 114

STORAGE 202
PRINT JOB 204
JOB ATTRIBUTE 206

@PJL JOB NAME="TEST. TXT
@PJL COMMENT "HP UNIVERSAL PRINTING PCL 6 (0.3.1584.22695);
WINDOWS 10 ENTERPRISE 10.0.17763.1; UNIDRV 0.3.17763.1"
@PJL COMMENT "USERNAME: PRADHAPU: APP FILENAME: TEST2 THERE.
TXT: 7-2-2019"
@PJL COMMENT "NUP_1"
@PJL SET RET=OFF
@PJL DMINFO ASCIIHEX="040040101020D101001153230313930373
032303435373333"
@PJL SET HOLD=ON

@PJL SET LASTPRINTEDPAGENUM=0  — 206

@PJL SET USERNAME="PRADHAPU"
@PJL SET SEPARATORPAGE=OFF
@PJL SET FOLD=""
@PJL SET PUNCH=OFF

FIG. 2B

PULL-PRINT SERVERS

BACKGROUND

Printers, such as multifunctional peripherals (MFP) and the like, may be capable of printing documents and/or images. Some printers may support a "pull printing" feature, where a pull-print server (e.g. a cloud server) may receive a print job including print data from a client device and store the print job. Further, when a user inputs a pull-print request through the printer, the printer may receive the print job from the pull-print server and perform printing.

BRIEF DESCRIPTION OF THE DRAWINGS

Examples are described in the following detailed description and in reference to the drawings, in which:

FIG. 2A is a block diagram of the example pull-print server of FIG. 1, depicting additional features;

FIG. 2B depicts an example print-ready file, including a job attribute to maintain page count information;

DETAILED DESCRIPTION

Figure 1:
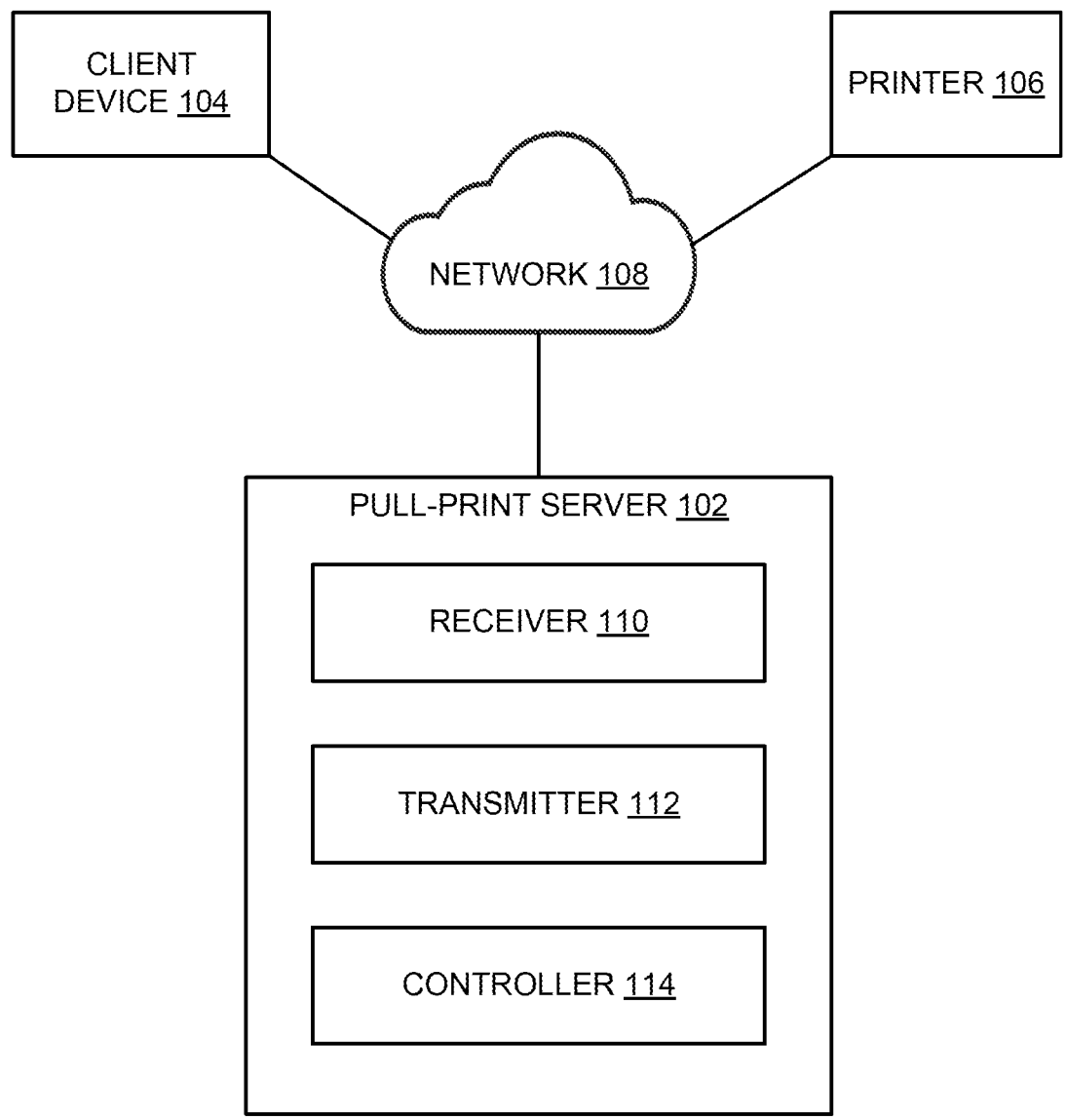
FIG. 1 is a block diagram of an example pull-print server, including a controller to cause an interrupted print job to resume based on page count information.

Pull printing may refer to a printing feature where a print job can be held on a pull-print server (e.g., server-based pull printing) or on a client device (e.g., serverless pull printing) and released by a user at a printer, which supports the printing feature. In server-based pull printing, the print job initiated from the client device is sent to the pull-print server. Further, the printer may receive the print job from the pull-print server and perform printing when the user inputs a print request through the printer. In this example, the user authenticates the print job at the printer using security measures, such as personal identification number (PIN), a password, a smartcard, or the like, to release the print job. Similarly, in serverless pull printing, the print job may be held on the client device until released to the printer by the user.

In pull printing, when the print job is interrupted due to a printer failure (e.g., paper jam, out of paper, out of ink, mechanical failure, memory error, or the like), the user may have to wait for a significant amount of time for the printer to recover and resume printing. However, such a scenario may lead to a risk of an unintentional disclosure of information, for instance, when remaining printed pages are not collected from the recovered printer.

In another example, when the print job is interrupted due to the printer failure, the user can pull the print job on a different printer. However, the different printer may not be aware of a number of pages that have been printed and hence the print process may have to be started from beginning.

For example, consider that the client device sends a print job having 700 pages to the pull-print server. Further, a first printer may receive the print job from the pull-print server and perform printing when the user inputs a print request through the first printer. During the printing process, consider that the print job is interrupted due to the printer failure after printing 500 pages. In this case, the user may have to pull the print job through a second printer. However, the second printer may not have any information on a number of pages printed by the first printer and/or a number of pages that have to be printed to complete the print job. In such a scenario, the print process may have to start from beginning, which may result in a wastage of print resources such as paper and ink, and also consume a significant amount of time.

Examples described herein may provide a pull-print server including a receiver to receive a print job from a client device. Example print job may include a first page and a second page. Further, the pull-print server may include a transmitter to transmit the print job to a printer in response to a reception of a first pull-print request from the printer. Furthermore, the pull-print server may include a controller to receive page count information from the printer upon completion of printing of the first page. Example page count information may indicate a number of pages printed corresponding to the print job. Further, the controller may detect an interruption of the print job prior to completion of the print job. In this example, the controller may cause the printer to terminate the print job and a user session associated with the print job upon detecting the interruption.

In response to a reception of a second pull-print request from the printer or another printer, the controller may cause the interrupted print job to resume on the printer or the other printer based on the page count information. Thus, examples described herein may provide the pull-print server to facilitate seamless printing, and save the print resources (e.g., media and ink) and printing time.

In the following description, for purposes of explanation, numerous specific details are set forth in order to provide a thorough understanding of the present techniques. However, the example apparatuses, devices, and systems, may be practiced without these specific details. Reference in the specification to "an example" or similar language means that a particular feature, structure, or characteristic described may be included in at least that one example but may not be in other examples.

Turning now to the figures, FIG. 1 is a block diagram of a pull-print server 102, including a controller 114 to cause an interrupted print job to resume based on page count information. As shown in FIG. 1, pull-print server 102 may be communicatively coupled to a client device 104 and a printer 106 via a network 108. Example network 108 may be a local area network (LAN), a wide area network (WAN), the Internet, a wired connection, and/or the like. A network printing environment of FIG. 1 is illustrated using a client device and a printer; however, the network printing environment can include multiple client devices communicatively connected to multiple printers via pull-print server 102.

Client device 104 may be an electronic device that can be used to generate a print job. Example client device 104 may be a laptop, a desktop, a mainframe computer, a smartphone, a personal digital assistant (FDA), an Internet of Things (IoT) device, or any other device capable of generating the print job for printing. Further, client device 104 may include a printer driver that is either installed in or accessible to client device 104 to generate the print job and send the print job for printing. For example, the printer driver may generate a print-ready file corresponding to the print job. The print-ready file may include print data and job attributes defining instructions to printer 106 to perform the print job. For example, the print-ready file may be in a format such as PCL, PJL, PS, PRN, XPS, PDF, TIFF, JPEG, TXT, ASCII, or the like. An example PRN file is depicted in FIG. 2B.

Further, client device 104 may spool the print job to pull-print server 102. Furthermore, printer 106 may retrieve the print job from pull-print server 102 in response to reception of a print request from a user and execute the retrieved print job. Example printer 106 can be a laser beam printer (e.g., using an electrophotographic method for printing), an ink jet printer (e.g., using an ink jet method for printing), or the like.

As shown in FIG. 1, pull-print server 102 may include a receiver 110 to receive the print job from client device 104. Example print job may include a first page and a second page. Further, pull-print server 102 may include a transmitter 112 to transmit the print job to printer 106 via network 108 in response to a reception of a first pull-print request from printer 106. In an example, the user may authenticate the print job at printer 106 using security measures such as a PIN, password, smartcard, or the like to release the print job. Upon authentication, printer 106 may send the first pull-print request to pull-print server 102 to obtain the print job.

Further, pull-print server 102 may include a controller 114 to receive page count information from printer 106 upon completion of printing of the first page. The page count information may indicate a number of pages printed corresponding to the print job. Further, controller 114 may detect an interruption of the print job prior to completion of the print job. In this example, controller 114 may cause printer 106 to terminate the print job and a first user session associated with the print job in response to a detection of the interruption.

Furthermore, controller 114 may cause the interrupted print job to resume on printer 106 based on the page count information and in response to a reception of a second pull-print request from printer 106. In an example; the first pull-print request and the second pull-print request are to retrieve the print job from pull-print server 102 in the first user session and a second user session, respectively.

In an example, controller 114 may transmit a notification to a user interface (e.g., a graphical user interface) of printer 106 in response to the reception of the second pull-print request. The notification may include an option to resume the print job based on the page count information. Further, controller 114 may cause the interrupted print job to resume in response to a selection of the option via the user interface of printer 106.

In another example, in response to the reception of the second pull-print request, controller 114 may cause transmitter 112 to transmit the interrupted print job including the page count information to printer 106. Further, printer 106 can resume the interrupted print job to print the second page based on the page count information.

In some examples, the functionalities described herein, in relation to instructions to implement functions of receiver 110, transmitter 112, controller 114, and any additional instructions described herein in relation to the storage medium, may be implemented as engines or modules including any combination of hardware and programming to implement the functionalities of the modules or engines described herein. The functions of receiver 110, transmitter 112, and controller 114 may also be implemented by a respective processor. In examples described herein, the processor may include, for example, one processor or multiple processors included in a single device or distributed across multiple devices.

FIG. 2A is a block diagram of example pull-print server 102 of FIG. 1, depicting additional features. For example, similarly named elements of FIG. 2A may be similar in structure and/or function to elements described with respect to FIG. 1. As shown in FIG. 2A, pull-print server 102 may include a storage 202 to store a print job 204 received from client device 104 (e.g., as shown in FIG. 1). Further, storage 202 may store job attribute 206 corresponding to print job 204. In an example, job attribute 206 may include the page count information corresponding to print job 204.

During operation, controller 114 may update the received page count information in job attribute 206 associated with print job 204. Example page count information may include a page number associated with the first page upon completion of printing of the first page. Further, controller 114 may repeat the steps of receiving the page count information and updating job attribute 206 for a next page until completion of print job 204 or detection of the interruption of print job 204. In an example, upon detection of the interruption of print job 204, controller 114 may use the page count information to resume interrupted print job 204 on a same printer or a different printer. In another example, upon the completion of print job 204, controller 114 may reset the page count information. Further, controller 114 may store print content associated with print job 204 in storage 202 upon reset of the page count information.

FIG. 2B depicts an example print-ready file 252, including a job attribute 206 to maintain the page count information. In the example shown in FIG. 2B, print-ready file 252 is a PRN file. Print-ready file 252 may include job attributes/details and/or instructions for a printer to print the print data. For example, print-ready file 252 may include content to be printed (i.e., the print data) and corresponding job attributes characterizing job features such as job queuing, cancellation, execution, and priority. Example job attributes may include a print job identifier, print job name, size of the print job, number of copies, orientation of the media, media size, media type, time stamp, speed, simplex, duplex, and/or the like.

In the example shown in FIG. 2B, print-ready file 252 may also include a job attribute "last printed page number" (e.g., 206) to indicate the page count information (i.e., a number of pages printed corresponding to the print job). Print-ready file 252 may be generated using a printer driver installed in a client device by choosing "print-ready file" within a print dialog box in Windows®, for instance. The client device may initially set job attribute 206 to "0" while generating print-ready file 252.

Further, print-ready file 252 may be transmitted to a pull-print server. During execution of the print job by the printer, the pull-print server may receive the page count information from the printer upon successful printing of each page in the print job. Further, the pull-print server may update the received page count information in job attribute 206 (e.g., "last printed page number+1"), The updated page count information may be used to resume an interrupted print job on a same printer (e.g., as shown in FIG. 1) or a different printer (e.g., as shown in Fla 3).

Figure 3:
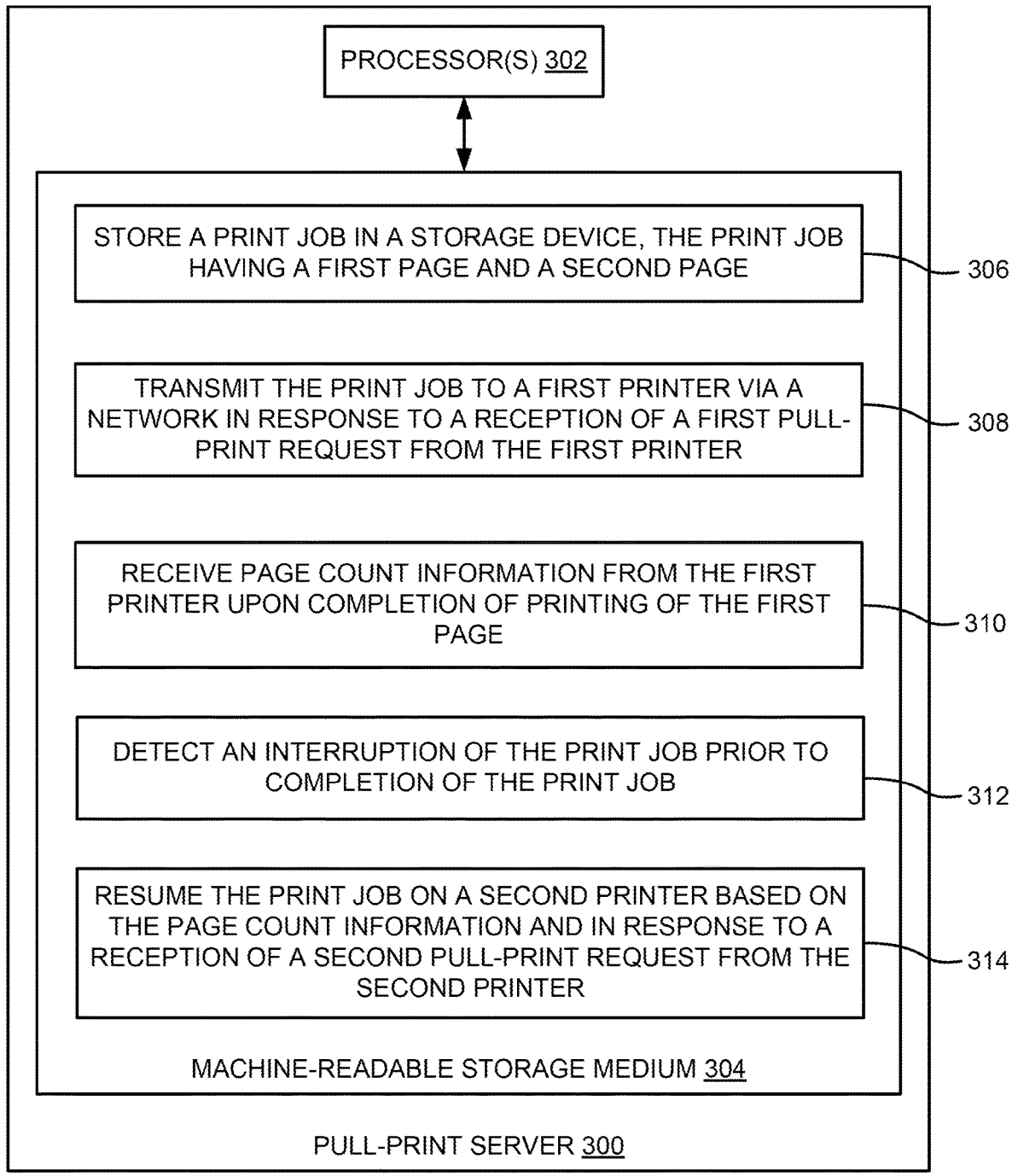
FIG. 3 is a block diagram of an example pull-print server including non-transitory machine-readable storage medium storing instructions to resume a print job.

FIG. 3 is a block diagram of an example pull-print server 300 including non-transitory machine-readable storage medium 304 storing instructions (e.g., 306 to 314) to resume a print job. Pull-print server 300 may include a processor 302 and machine-readable storage medium 304 communicatively coupled through a system bus. Processor 302 may be any type of central processing unit (CPU), microprocessor, or processing logic that interprets and executes machine-readable instructions stored in machine-readable storage medium 304. Machine-readable storage medium 304 may be a random-access memory (RAM) or another type of dynamic storage device that may store information and machine-readable instructions that may be executed by processor 302. For example, machine-readable storage medium 304 may be synchronous DRAM (SDRAM), double data rate (DDR), rambus DRAM (RDRAM), rambus RAM, etc., or storage memory media such as a floppy disk, a hard disk, a CD-ROM, a DVD, a pen drive, and the like. In an example, machine-readable storage medium 304 may be non-transitory machine-readable medium. Machine-readable storage medium 304 may be remote but accessible to pull-print server 300.

As shown in FIG. 3, machine-readable storage medium 304 may store instructions 306-314. In an example, instructions 306-314 may be executed by processor 302 to resume the print job. Instructions 306 may be executed by processor 302 to store the print job in a storage device. The print job may include a first page and a second page. In an example, the print job may be received from a client device via a network.

Instructions 308 may be executed by processor 302 to transmit the print job to a first printer via the network in response to a reception of a first pull-print request from the first printer. Instructions 310 may be executed by processor 302 to receive page count information from the first printer upon completion of printing of the first page. In an example, the page count information may indicate a number of pages printed corresponding to the print job.

In an example, machine-readable storage medium 304 may include instructions to update the page count information in a job attribute associated with the print job that is stored in the storage device. Further, machine-readable storage medium 304 may include instructions to repeat the steps of receiving the page count information and updating the job attribute for a next page until completion of the print job or detection of the interruption of the print job.

Instructions 312 may be executed by processor 302 to detect an interruption of the print job prior to completion of the print job. In an example, instructions may be executed by processor 302 to cause the first printer to terminate the print job and a user session associated with the print job upon detecting the interruption of the print job.

Further, instructions 314 may be executed by processor 302 to resume the print job on a second printer based on the page count information and in response to a reception of a second pull-print request from the second printer. In an example, instructions to resume the print job on the second printer may include instructions to transmit the print job including the updated job attribute to the second printer in response to the reception of the second pull-print request and cause the interrupted print job to resume based on the updated job attribute.

Figure 4A:
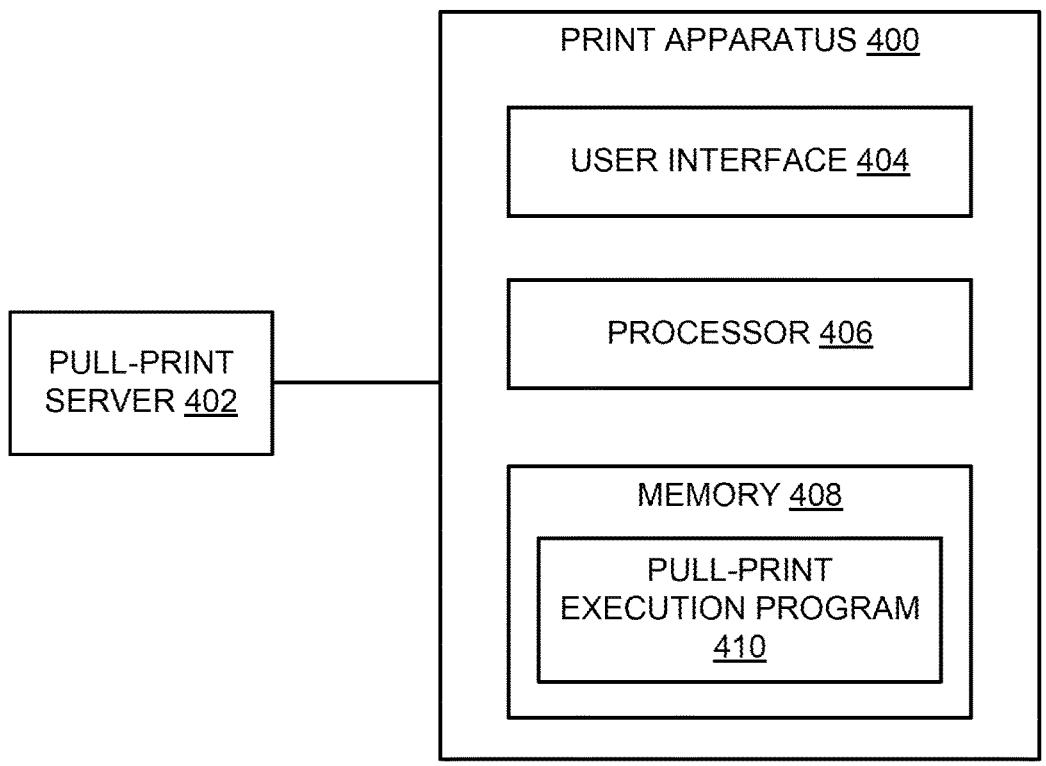
FIG. 4A is a block diagram of an example print apparatus, including a pull-print execution program to resume a print job based on page count information.

FIG. 4A is a block diagram of an example print apparatus 400, including a pull-print execution program 410 to resume a print job based on page count information. In examples described herein, print apparatus 400 may be a single-function device or a multifunctional peripheral (MFP). Print apparatus 400 may print content on a print medium (e.g., a paper) with a print material (e.g., ink, toner, or the like).

In an example, print apparatus 400 may include a user interface 404 to facilitate interactions between a user and print apparatus 400. In an example, user interface 404 may be provided, at a control panel of print apparatus 400, for the user to locate the print job on a pull-print server 402. In other examples, the user may locate the print job on a client device via user interface 404 (e.g., serverless pull printing).

Further, print apparatus 400 may include a processor 406 and memory 408 communicatively coupled to the processor and user interface 404. In an example, the control panel (e.g., user interface 404) may be in electronic communication with processor 406. Furthermore, memory 408 may include pull-print execution program 410. In an example, pull print execution program 410 may download the print job from pull-print server 402 to memory 408 to execute the print job.

During operation, pull-print execution program 410 may receive, via user interface 404, a user input to retrieve a print job from pull-print server 402. In an example, pull-print server 402 may be communicatively coupled to print apparatus 400 via a network. Further, pull-print execution program 410 may transmit a pull-print request corresponding to the user input to pull-print server 402. In an example, pull-print execution program 410 may transmit the pull-print request to pull-print server 402 upon authentication of user credentials such as a PIN, password, smartcard, or the like.

Further, pull-print execution program 410 may obtain the print job corresponding to the pull-print request from pull-print server 402. In an example, the print job may include page count information indicating a number of pages previously printed corresponding to the print job.

Furthermore, pull-print execution program 410 may generate a notification on user interface 404 (e.g., a graphical user interface). In an example, the notification may include a first option to resume the print job based on the page count information. Furthermore, pull-print execution program 410 may resume the print job in response to a selection of the first option via user interface 404. In an example, pull-print execution program 410 may update the page count information indicating a page number associated with a current page of the resumed print job upon completion of printing of the current page. Further, pull-print execution program 410 may transmit the updated page count information to pull-print server 402. Furthermore, pull-print execution program 410 may repeat the steps of update and transmit the updated page count information for a next page until completion of the print job or detection of an interruption of the print job.

Figure 4B:
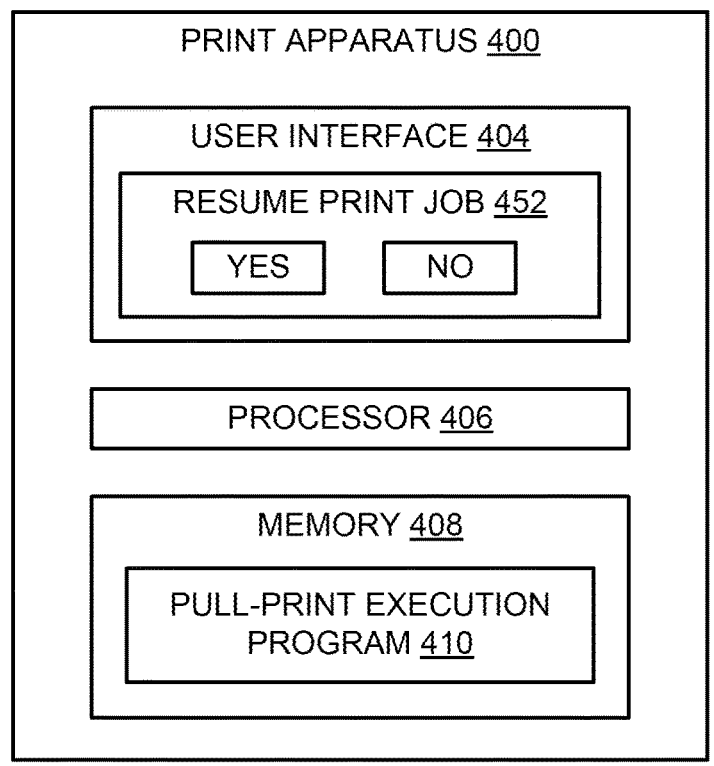
FIG. 4B is a block diagram of the example print apparatus of FIG. 4A, depicting additional features.

FIG. 4B is a block diagram of example print apparatus 400 of FIG. 4A, depicting additional features. For example, similarly named elements of FIG. 4B may be similar in structure and/or function to elements described with respect to FIG. 4A. In an example, upon receiving the user input, pull-print execution program 410 may retrieve a job attribute having the page count information from the print job. Further, pull-print execution program 410 may generate a notification 452 having the first option (e.g., "yes") to resume the print job in response to a determination that the page count information in the job attribute is greater than zero. Further, notification 452 may include a second option (e.g., "no") to re-execute the print job from beginning by resetting the page count information.

Figure 5:
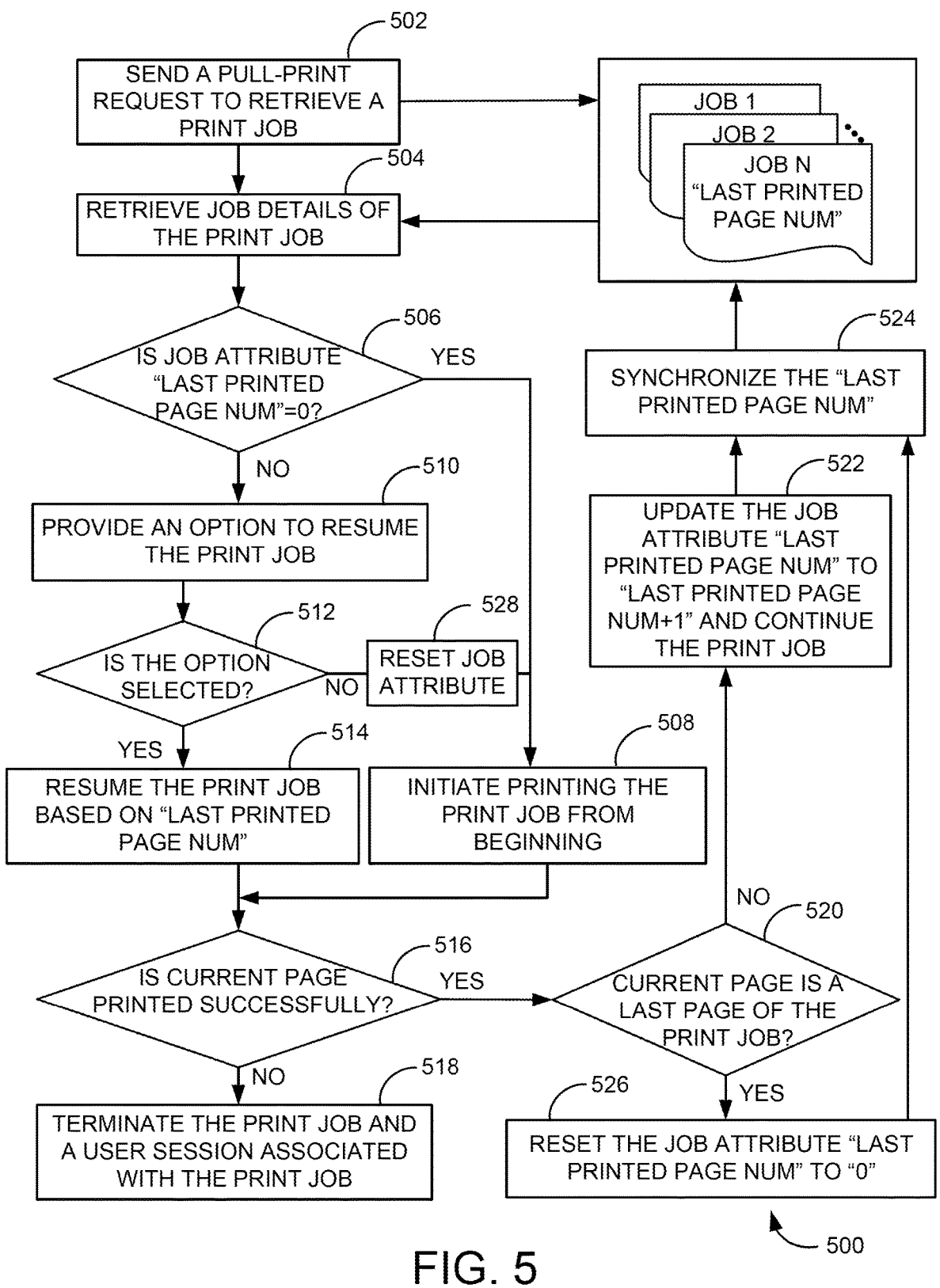
FIG. 5 is a flowchart illustrating an example method for resuming a print job based on page count information.

FIG. 5 is a flowchart illustrating an example method 500 for resuming a print job based on pale count information. It should be understood that method 500 depicted in FIG. 5 represents generalized illustrations, and that other processes may be added, or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. The processes of method 500 may represent functions and/or actions performed by functionally equivalent circuits like analog circuits, digital signal processing circuits, application specific integrated circuits (ASICs), or other hardware components associated with the system. Furthermore, example method 500 may not be intended to limit the implementation of the present application, but rather example method 500 illustrates functional information to design/fabricate circuits, generate machine-readable instructions, or use a combination of hardware and machine-readable instructions to perform the illustrated processes.

At 502, a pull-print request to retrieve the print job may be sent to a pull-print server. For example, a user may request to release the print job at a printer via a control panel of the printer. Upon receiving the request, the printer may authenticate the user based on user credentials, for instance. Further, the printer may communicate with the pull-print server to retrieve the requested print job upon authentication. In an example, the pull-print server may store multiple print jobs (e.g., job 1 to job N) and corresponding job details such as a job attribute (e.g., "last printed page number") as shown in FIG. 5.

At 504, job details corresponding to the print job may be retrieved from the pull-print server. At 506, a check may be made to determine whether the job attribute "last printed page number" (e.g., the page count information) in the print job is "0". When the job attribute "last printed page number" is "0", the print job may be initiated to start a print process from beginning, at 508. When the job attribute "last printed page number" is not "0", the printer may provide an option to the user to resume the print job from a last printed page, at 510.

At 512, a check may be made to determine whether the user selected the option to resume the print job. When the user does not select the option to resume the print job, the job attribute "last printed page number" may be reset to "0", at 528 and the print job may be initiated to start the print process from beginning, at 508. When the user selects the option to resume the print job, the printer may resume the print job based on the job attribute "last printed page number", at 514.

Upon initiating the print job (e.g., at 508) or resuming the print job (e.g., at 514), a check may be made to determine whether a current page in the print job is printed successfully, at 516. When the current page in the print job is not printed successfully, the print job and a user session associated with the print job may be terminated, at 518. When the current page in the print job is printed successfully, a check may be made to determine whether the printed current page is a last page to be printed in the print job, at 520. When the printed current page is not the last page of the print job, the job attribute "last printed page number" may be updated with a page number of the printed current page (e.g., "last printed page number+1") and the print job may be continued to execute, at 522. At 524, the updated job attribute "last printed page number" may be synchronized to the pull-print server.

When the printed current page is the last page of the print job, the job attribute "last printed page number" may be reset to "0", at 526. Upon resetting the job attribute to "0", the job attribute "last printed page number" may be synchronized to the pull-print server, at 524. Thus, upon successfully printing each page in the print job, the job attribute "last printed page number" may be updated to "last printed page number+1" and corresponding job details in the pull-print server may be updated. The process at blocks 516 to 526 may be repeated for a next page until completion of the print job or detection of the interruption of the print job.

The above-described examples are for the purpose of illustration. Although the above examples have been described in conjunction with example implementations thereof, numerous modifications may be possible without materially departing from the teachings of the subject matter described herein. Other substitutions, modifications, and changes may be made without departing from the spirit of the subject matter. Also, the features disclosed in this specification (including any accompanying claims, abstract, and drawings), and/or any method or process so disclosed, may be combined in any combination, except combinations where some of such features are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus. In addition, the terms "first" and "second" are used to identify individual elements and may not meant to designate an order or number of those elements.

The present description has been shown and described with reference to the foregoing examples. It is understood, however, that other forms, details, and examples can be made without departing from the spirit and scope of the present subject matter that is defined in the following claims.

What is claimed is:

1. A pull-print server comprising:
   a receiver to receive a print job from a client device, the print job having a first page and a second page;
   a storage device communicatively coupled to a controller, wherein the controller is to store the print job received from the client device in the storage device;
   a transmitter to transmit the print job to a first printer via a network in response to a reception of a first pull-print request from the first printer; and
   the controller to further:
      receive page count information from the first printer upon completion of printing of the first page;
      detect an interruption of the print job prior to completion of the print job; and
      cause the interrupted print job to resume on a second printer based on the page count information and in response to a reception of a second pull-print request from the second printer.

2. The pull-print server of claim 1, wherein the controller is to:
   update the received page count information in a job attribute associated with the print job, wherein the page count information comprises a page number associated with the first page; and
   repeat receiving of the page count information and updating of the job attribute for a next page until completion of the print job or detection of the interruption of the print job.

3. The pull-print server of claim 1, wherein the controller is to:
   transmit a notification to a user interface of the second printer in response to the reception of the second pull-print request, the notification comprising an option to resume the print job based on the page count information; and
   cause the interrupted print job to resume in response to a selection of the option via the user interface of the second printer.

4. The pull-print server of claim 1, wherein the controller is to:
reset the page count information upon completion of the print job; and
store print content associated with the print job in a storage upon reset of the page count information.

5. A non-transitory machine-readable storage medium encoded with instructions that, when executed by a processor of a pull-print server, cause the processor to:
store a print job in a storage device, the print job having a first page and a second page;
transmit the print job to a first printer via a network in response to a reception of a first pull-print request from the first printer;
receive page count information from the first printer upon completion of printing of the first page, wherein the page count information is to indicate a number of pages printed corresponding to the print job;
detect an interruption of the print job prior to completion of the print job; and
resume the print job on a second printer based on the page count information and in response to a reception of a second pull-print request from the second printer.

6. The non-transitory machine-readable storage medium of claim 5, further comprising instructions to:
cause the first printer to terminate the print job and a user session associated with the print job upon detecting the interruption of the print job.

7. The non-transitory machine-readable storage medium of claim 5, further comprising instructions to:
update the page count information in a job attribute associated with the print job that is stored in the storage device; and
repeat receiving of the page count information and updating of the job attribute for a next page until completion of the print job or detection of the interruption of the print job.

8. The non-transitory machine-readable storage medium of claim 7, wherein instructions to resume the print job on the second printer comprise instructions to:
transmit the print job including the updated job attribute to the second printer in response to the reception of the second pull-print request; and
cause the interrupted print job to resume based on the updated job attribute.

9. The non-transitory machine-readable storage medium of claim 5, wherein the print job is received from a client device via the network.

10. A print apparatus comprises:
a user interface;
a processor; and
memory communicatively coupled to the processor and the user interface, wherein the memory comprises a pull-print execution program to:
receive, via the user interface, a user input to retrieve a print job stored in a storage device of a pull-print server, wherein the pull-print server is communicatively coupled to the print apparatus via a network;
transmit a pull-print request corresponding to the user input to the pull-print server;
obtain the print job corresponding to the pull-print request from the pull-print server, the print job comprising page count information indicating a number of pages previously printed on a first printer and corresponding to the print job;
generate a notification on the user interface, the notification comprising a first option to resume the print job on a second printer based on the page count information; and
resume the print job on the second printer in response to a selection of the first option.

11. The print apparatus of claim 10, wherein the pull-print execution program is to:
retrieve a job attribute having the page count information from the print job; and
generate the notification having the first option to resume the print job in response to a determination that the page count information in the job attribute is greater than zero.

12. The print apparatus of claim 10, wherein the pull-print execution program is to:
update the page count information indicating a page number associated with a current page of the resumed print job upon completion of printing of the current page;
transmit the updated page count information to the pull-print server; and
repeat updating and transmitting of the updated page count information for a next page until completion of the print job or detection of an interruption of the print job.

13. The print apparatus of claim 10, wherein the notification comprises a second option to re-execute the print job from beginning by resetting the page count information.

14. The print apparatus of claim 10, wherein the pull-print execution program is to transmit the pull-print request to the pull-print server upon authentication of user credentials.

15. The pull-print server of claim 1, wherein the page count information is to indicate a number of pages printed corresponding to the print job.

16. The pull-print server of claim 1, wherein the first pull-print request and the second pull-print request are to retrieve the print job from the pull-print server in a first user session and a second user session, respectively.

* * * * *